United States Patent
Zinola et al.

(10) Patent No.: US 10,167,758 B2
(45) Date of Patent: Jan. 1, 2019

(54) PRODUCT FOR THE DEPOLLUTION OF EXHAUST GASES, ESPECIALLY FROM AN INTERNAL COMBUSTION ENGINE, AND METHOD FOR THE DEPOLLUTION OF EXHAUST GASES USING SAID PRODUCT

(71) Applicant: IFP Energies nouvelles, Rueil-Malmaison (FR)

(72) Inventors: Stéphane Zinola, Charly (FR); Stéphane Raux, Orlienas (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/534,974

(22) PCT Filed: Dec. 1, 2015

(86) PCT No.: PCT/EP2015/078199
§ 371 (c)(1),
(2) Date: Jun. 9, 2017

(87) PCT Pub. No.: WO2016/091657
PCT Pub. Date: Jun. 16, 2016

(65) Prior Publication Data
US 2017/0350288 A1    Dec. 7, 2017

(30) Foreign Application Priority Data
Dec. 11, 2014  (FR) .................................. 14 62228

(51) Int. Cl.
*B01D 53/94*  (2006.01)
*F01N 3/20*  (2006.01)
(Continued)

(52) U.S. Cl.
CPC ............. *F01N 3/035* (2013.01); *B01D 53/90* (2013.01); *B01D 53/944* (2013.01);
(Continued)

(58) Field of Classification Search
CPC ..... F01N 3/035; F01N 3/2066; F01N 2610/03; F01N 13/0097; F01N 2570/14;
(Continued)

(56) References Cited

U.S. PATENT DOCUMENTS 5,482,692 A * 1/1996 Audeh ............... B01D 53/8621
423/239.2
5,535,708 A   7/1996 Valentine
(Continued)

FOREIGN PATENT DOCUMENTS

EP   1378560 A2   1/2004
EP   2541012 A2   1/2013

OTHER PUBLICATIONS

International Search Report for PCT/EP2015/078199 dated Feb. 8, 2016; English translation submitted herewith (7 Pages).

*Primary Examiner* — Timothy C Vanoy
(74) *Attorney, Agent, or Firm* — Fitch, Even, Tabin & Flannery, L.L.P.

(57) ABSTRACT

A product for depollution of exhaust gas includes a mixture of an additive for treating particles and a reductant for eliminating nitrogen oxides (NOx). The reductant can contain ammonia or a compound generating ammonia by decomposition, or a hydrocarbon from a hydrocarbon-containing substance, oxygenated or not. The addictive for treating particles can be an additive for catalyzing particle oxidation.

16 Claims, 2 Drawing Sheets

(51) Int. Cl.
   *F01N 3/10*   (2006.01)
   *F01N 13/00*  (2010.01)
   *F01N 3/035*  (2006.01)
   *B01D 53/90*  (2006.01)

(52) U.S. Cl.
   CPC ..... *B01D 53/9409* (2013.01); *B01D 53/9418* (2013.01); *B01D 53/9495* (2013.01); *F01N 3/106* (2013.01); *F01N 3/206* (2013.01); *F01N 3/2066* (2013.01); *F01N 13/0097* (2014.06); *B01D 2251/206* (2013.01); *B01D 2251/208* (2013.01); *B01D 2255/20738* (2013.01); *B01D 2255/20753* (2013.01); *B01D 2255/906* (2013.01); *B01D 2257/404* (2013.01); *B01D 2258/012* (2013.01); *F01N 2570/14* (2013.01); *F01N 2610/01* (2013.01); *F01N 2610/02* (2013.01); *F01N 2610/03* (2013.01); *Y02T 10/24* (2013.01)

(58) Field of Classification Search
   CPC ...... F01N 2610/02; F01N 3/106; F01N 3/206; B01D 53/9418; B01D 2252/207638; B01D 2201/00; B01D 2251/2062; B01D 2251/21; B01D 2257/402; B01D 2257/404; B01D 2258/01
   See application file for complete search history.

(56) References Cited

U.S. PATENT DOCUMENTS

| | | | |
|---|---|---|---|
| 5,809,774 A * | 9/1998 | Peter-Hoblyn | B01D 53/90 60/274 |
| 9,784,157 B2 * | 10/2017 | Norton | B01D 53/9409 |
| 2003/0226312 A1 * | 12/2003 | Roos | F02M 25/0228 44/280 |
| 2007/0214777 A1 * | 9/2007 | Allansson | B01D 53/90 60/299 |
| 2014/0165888 A1 | 6/2014 | Johnson et al. | |
| 2015/0020506 A1 * | 1/2015 | Johansen | B01D 53/90 60/274 |

* cited by examiner

PRODUCT FOR THE DEPOLLUTION OF EXHAUST GASES, ESPECIALLY FROM AN INTERNAL COMBUSTION ENGINE, AND METHOD FOR THE DEPOLLUTION OF EXHAUST GASES USING SAID PRODUCT

CROSS-REFERENCE TO RELATED APPLICATIONS

This application is a U.S. national phase application filed under 35 U.S.C. § 371 of International Application No. PCT/EP2015/078199, filed Dec. 1, 2015, designating the United States, which claims priority from French Patent Application No. 14/62.228, filed Dec. 11, 2014, which are hereby incorporated herein by reference in their entirety for all purposes.

FIELD OF THE INVENTION

The present invention relates to a product for depollution of exhaust gas, notably from internal-combustion engines, in particular for motor vehicles, and to an exhaust gas depollution method using same.

More particularly, it concerns a method for treating pollutants contained in the exhaust gas of a Diesel type internal-combustion engine, notably for a motor vehicle, but it does not rule out by any means such a method for spark-ignition engines, such as those running on gaseous fuel or on gasoline, in particular with a lean mixture.

BACKGROUND OF THE INVENTION

As it is well known, exhaust gases from such engines contain many pollutants such as unburnt hydrocarbons (HC), carbon monoxide, nitrogen oxides (NO and $NO_2$), more commonly referred to as NOx, as well as particles.

It is widely agreed that NOx emissions result from the combustion that occurs at high temperatures and in the presence of oxygen. These conditions are generally encountered in any type of combustion, in particular those taking place under lean burn conditions, such as direct injection in lean burn mode, whatever the fuel used.

Now, NOx emissions involve a major drawback as they have a harmful effect directly on human health, in particular $NO_2$, and indirectly through the secondary formation of tropospheric ozone.

In order to comply with the emissions standards and to preserve the environment and human health, it has become necessary to treat these pollutants prior to discharging the exhaust gas to the atmosphere.

As it is generally well known, this is achieved by means of a treatment for depolluting the exhaust gas circulating in the exhaust line of the engine.

Thus, in order to treat the unburnt hydrocarbons and the carbon monoxide from engines running with a lean mixture, catalysis means such as an oxidation catalyst are arranged on the exhaust line.

As regards exhaust gas, in particular for a Diesel engine, a particle filter is advantageously arranged on this line so as to capture and to eliminate the particles present in the exhaust gas, and thus to avoid discharging them to the atmosphere.

This filter, which can also be a catalysed filter, needs to be periodically regenerated in order to keep all of its filtration capacities by achieving combustion of the particles retained in this filter. These regeneration operations mainly consist in increasing the filter temperature, which may either occur spontaneously when using the engine at high load, or be generated by an exothermic oxidation, on a catalyst arranged upstream from the filter, of reducing chemical species resulting from the combustion or from an injection directly into the exhaust, triggered by the engine control.

As regards the NOx emissions, the exhaust gas also flows through other catalysis means, notably catalysts of SCR (Selective Catalytic Reduction) type. This SCR catalyst allows to selectively reduce the NOx to nitrogen through the action of a reductant.

This reductant, which is generally injected upstream from the SCR catalyst, can be ammonia or a compound generating ammonia by decomposition, such as urea, or a hydrocarbon from a hydrocarbon-containing substance, oxygenated or not.

Currently, the commonest technique for NOx depollution is SCR catalysis using ammonia.

This ammonia is indirectly obtained by decomposition of a precursor injected in liquid form, generally a 32.5 mass % aqueous urea solution, better known under the brand name "AdBlue" or "DEF".

Thus, the urea solution is injected into the exhaust line upstream from the SCR catalyst. The water contained in this solution is rapidly vaporized under the effect of the exhaust gas temperature, then each urea molecule decomposes in two stages into two ammonia molecules:

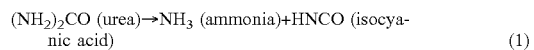

$$(NH_2)_2CO \text{ (urea)} \rightarrow NH_3 \text{ (ammonia)} + HNCO \text{ (isocyanic acid)} \qquad (1)$$

$$HNCO + H_2O \rightarrow NH_3 + CO_2 \qquad (2)$$

Alternatively, ammonia can be directly injected in gas state into the exhaust line upstream from the SCR catalyst.

As described in more detail in document EP-2,541,012, the exhaust gas depollution system comprises an exhaust line including a depollution means that combines a particle filter and a selective catalytic reduction (SCR) catalyst, this assembly being referred to as SCR catalysed filter or SCRF filter, a single tank containing a mixture of an additive for particle filter regeneration and of a reductant for elimination of the NOx present in this depollution means, and an injector for feeding this mixture upstream from the SCRF filter.

Although this system is satisfactory, it however involves not insignificant drawbacks.

Indeed, the system described in document EP-2,541,012 is limited to the use of a regeneration additive containing an oxygen storage capacity material.

Such an additive offers few advantages in an already oxygen-rich medium, such as an exhaust line of a lean running engine.

Besides, it is described that the catalytic phase of the SCR catalyst is protected only when it is coated in a particle filter.

This excludes in fact configurations where the particle filtration and NOx catalytic reduction by SCR functions are performed on dissociated elements.

Furthermore, the described system only concerns situations where the exhaust gas temperature is high.

Therefore, combustion of the particles is likely to further increase the temperature within the SCRF filter, which may lead to catalytic phase deterioration.

The present invention aims to overcome the aforementioned drawbacks by means of a product and a method allowing exhaust gas depollution to be carried out in a simple and effective manner.

SUMMARY OF THE INVENTION

The present invention thus relates to a product for depollution of exhaust gas, notably from an internal-combustion engine, said product being a mixture of an additive for treating particles and of a reductant for eliminating nitrogen oxides (NOx), characterized in that the product comprises a mixture of a reductant containing ammonia or a compound generating ammonia by decomposition, or a hydrocarbon from a hydrocarbon-containing substance, oxygenated or not, and of an additive for catalysing particle oxidation.

The product can comprise at least one metallic compound.

The metallic compound can be an organometallic compound.

The metallic compound can be a metal selected from among the following elements: sodium, potassium, magnesium, calcium, barium, strontium, titanium, cerium, chromium, molybdenum, manganese, iron, rubidium, cobalt, rhodium, nickel, palladium, platinum, copper, silver, or a mixture of at least two of these elements.

The organometallic compound can comprise ferrocene.

The metallic compound can be an inorganic metallic compound.

The inorganic metallic compound can be a compound selected from among: fluorides, chlorides, bromides, iodides, oxides, nitrates, sulfates, phosphates, hydrides, carbonates, nitrides, or a mixture of at least two of these compounds.

The invention also relates to a method for depollution of exhaust gas circulating in an exhaust line, notably of an internal-combustion engine, and using the aforementioned product, said line comprising a catalysis means for selective nitrogen oxides (NOx) catalytic reduction, a particle elimination means and means for feeding the product into the exhaust line, characterized in that it consists:

in determining the exhaust gas temperature, and as soon as this gas temperature has reached a threshold allowing treatment of the nitrogen oxides by said means to start, in feeding the product into the exhaust line.

The method can consist in feeding the product into the exhaust line on a regular basis.

The method can consist in controlling the injected product flow rate as a function of the amount of NOx.

The method can consist in combining, in a single element, the catalysis means for selective nitrogen oxides catalytic reduction and the particle elimination means in an SCR catalysed filter.

The method can consist in positioning the catalysis means for selective nitrogen oxides catalytic reduction before the particle elimination means.

The method can consist in positioning the particle elimination means before the catalysis means for selective nitrogen oxides catalytic reduction.

The method can consist in arranging at least one additional catalyst in the exhaust line.

BRIEF DESCRIPTION OF THE FIGURES

Other features and advantages of the invention will be clear from reading the description given hereafter by way of non limitative example, with reference to the accompanying figures wherein.

DETAILED DESCRIPTION

This exhaust gas depollution treating plant comprises an exhaust line 10 carrying exhaust gas from an internal-combustion engine 12, of a motor vehicle for example.

The internal-combustion engine is understood to be a Diesel engine, but this does not rule out by any means all the other internal-combustion engines such as engines running on gasoline or gas.

Figure 1:
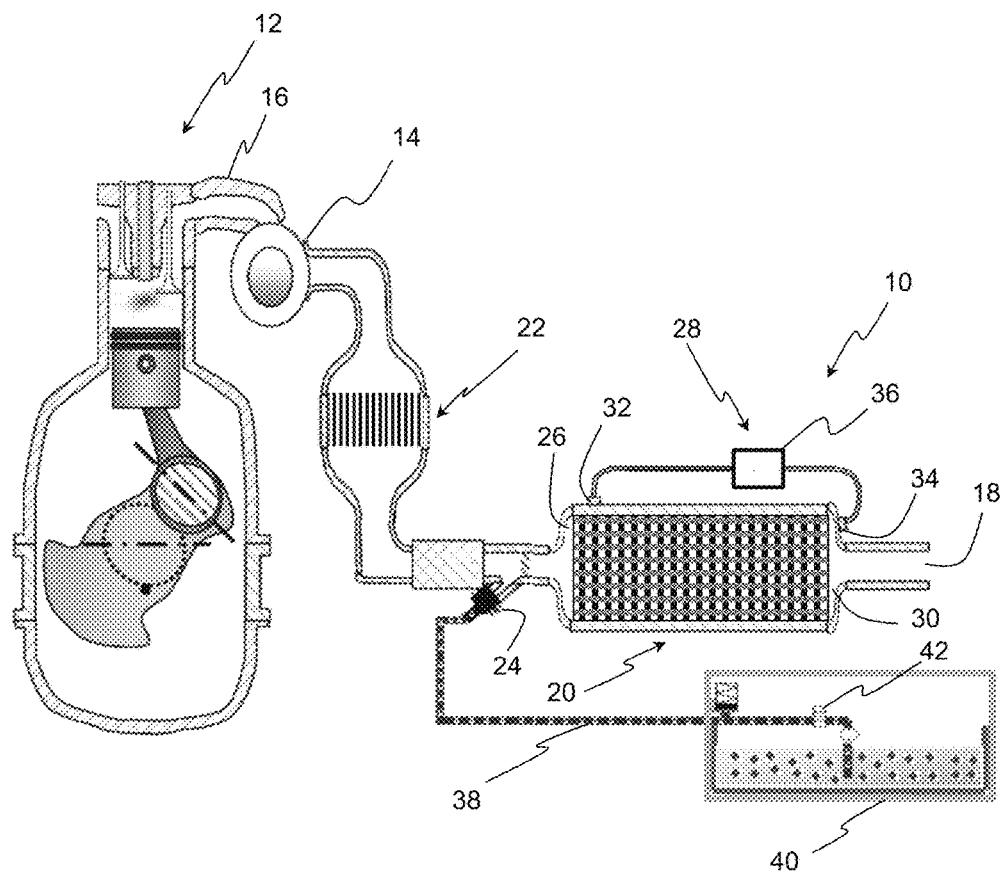
FIG. 1 shows a plant using the product and the method according to the invention.

As can be better seen in FIG. 1, exhaust line 10 comprises, in the direction of circulation of the exhaust gas from inlet 14 near to exhaust manifold 16 of the engine to outlet 18 where it vents to open air, at least one means for capture and elimination of the particles present in the exhaust gas, as well as a means for reduction of the NOx also contained in this gas.

Advantageously, but not necessarily, these means are combined in a single element better known as SCR catalysed filter or SCRF filter 20.

Preferably, this SCRF filter 20 is arranged downstream from an oxidation catalyst 22 whose purpose is to treat the unburnt hydrocarbons and the carbon monoxide contained in the exhaust gas before the latter passes through the SCRF filter.

This oxidation catalyst 22 is also intended to partly convert the nitrogen monoxide to nitrogen dioxide, the ideal case being an equimolar distribution among nitrogen monoxide and nitrogen dioxide at the SCRF filter inlet so as to maximize the efficiency thereof.

The exhaust line comprises a means, preferably an injector 24, for feeding a mixture of an additive for particle regeneration and of a reductant for NOx elimination.

This injector is arranged upstream from the SCRF filter and near to its inlet 26 so that this mixture can combine as homogeneously as possible with the exhaust gas before they are fed to the SCRF filter.

As is generally well known, the line comprises a means 28 for determining the differential pressure between SCRF filter inlet 26 and its outlet 30.

By way of example, this means comprises an upstream pressure detector 32 at SCRF filter inlet 26 which measures the exhaust gas pressure at this inlet, another detector 34, referred to as downstream detector, arranged at SCRF filter outlet 30, which measures the exhaust gas pressure at this outlet, and a calculation unit 36 for determining the pressure difference between the SCRF filter inlet and outlet. This allows the SCRF filter clogging rate due to the particles to be known.

In a manner known per se, the exhaust line carries a temperature detector (not shown) arranged on the exhaust line, more particularly at the SCRF filter inlet, which allows to know at any time the temperature of the exhaust gas circulating in this line.

Alternatively, logic and/or computer means can be provided, which allow to estimate at any time the temperature of the exhaust gas circulating in the line.

This line can also comprise an NOx detector (not shown) arranged at the outlet of SCRF filter 20 which allows to know at any time the amount of NOx flowing from the SCRF filter.

Similarly, logic and/or computer means can be provided, which allow to estimate at any time this amount of NOx.

The mixture fed into the exhaust line by injector 24 is carried through a pipe 38 connecting this injector to a tank 40 containing this mixture. The mixture is circulated between the tank and the injector under the effect of a pumping means such as a metering pump 42.

The mixture contained in the tank comprises an NOx reductant, which can be ammonia or a compound generating ammonia by decomposition, such as urea, or which can be a hydrocarbon from a hydrocarbon-containing substance, oxygenated or not, and a catalytic type additive for treating particles, more particularly an additive for catalysing the oxidation of these particles.

The catalytic type additive for particle treatment can be a metallic compound.

This metallic compound can be an organometallic compound, such as ferrocene for example. The metal of this organometallic compound can be sodium, potassium, magnesium, calcium, barium, strontium, titanium, cerium, chromium, molybdenum, manganese, iron, rubidium, cobalt, rhodium, nickel, palladium, platinum, copper, silver, or a mixture of at least two of these elements.

This metallic compound can be an inorganic metallic compound, such as nickel chloride for example. More generally, this inorganic metallic compound can belong to the family of fluorides, chlorides, bromides, iodides, oxides, nitrates, sulfates, phosphates, hydrides, carbonates, nitrides, or a mixture of these compounds.

For operation, the ECU that any engine is usually provided with knows at any time the exhaust gas temperature and the amount of NOx at the SCRF filter outlet.

As soon as the exhaust gas temperature has reached a threshold allowing the NOx treatment by SCRF filter 20 to start, the mixture contained in tank 30 is fed on a regular basis to the exhaust line by injector 24 upstream from the SCRF filter.

Advantageously, the amount of mixture injected into the exhaust line is substantially proportional to the formation of NOx and it is determined by the ECU.

Injection of this mixture upstream from the SCRF filter throughout the particle filter loading phase allows intimate mixing of the catalytic regeneration additive and the particles within the SCRF filter. The combination of the catalytic activity of the additive and the intimate contact between the particles and this catalytic additive allows to lower the temperature at which combustion of the particles starts, so as to make it compatible with the temperatures usually encountered at the exhaust of engines, if need be after addition of a post-injection that oxidizes on oxidation catalyst 22 and generates a heat release at inlet 26 of the SCRF filter.

Figure 2:
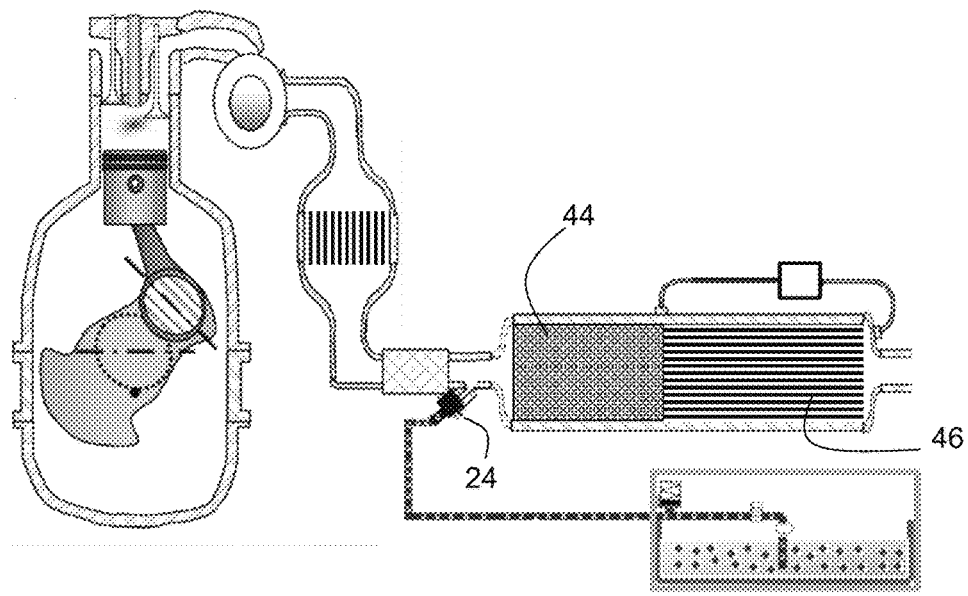
FIG. 2 illustrates a first variant of FIG. 1.

The variant of FIG. 2 differs from FIG. 1 in that the SCRF filter of FIG. 1, which is made of a single element, is replaced by at least two exhaust gas treating means.

One of the means is a SCR type catalyst 44 followed by another means which is a particle filter 46.

In this configuration, injector 24 is arranged upstream from the SCR catalyst.

Figure 3:
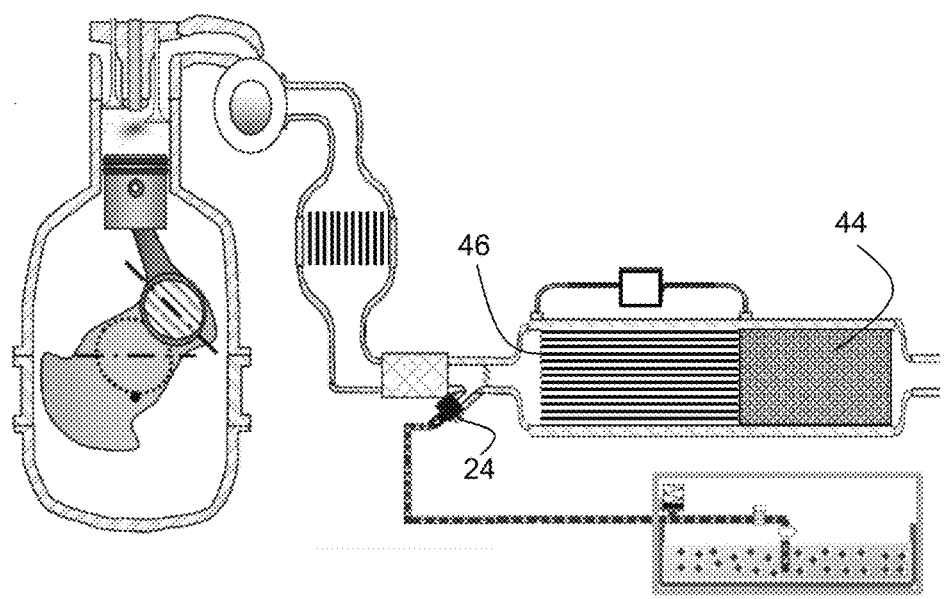
FIG. 3 is another variant of FIG. 1.

On the other hand, as illustrated in the variant of FIG. 3, one of the means is a particle filter 46 followed by another means such as a SCR type catalyst 44.

In this other configuration, injector 24 is upstream from particle filter 46.

The exhaust line comprises, for the variant of FIG. 2 as well as the variant of FIG. 3, an injector 24 for the mixture described above which comprises an additive for regenerating the particles of the particle filter and a reductant for NOx elimination by SCR catalyst 44.

This injector is arranged upstream from the exhaust gas treating means (SCR catalyst 44 or particle filter 46) that is the closer to oxidation catalyst 22.

Of course, without departing from the scope of the invention, the exhaust line comprising SCRF filter 20 or the exhaust line comprising an SCR catalyst 44 and a particle filter 46 can comprise additional catalysts, for example an SCR catalyst in addition to the SCRF filter, and/or a clean-up catalyst, etc.

The invention claimed is:

1. A method for depollution of exhaust gas circulating in an exhaust line using a product for depollution of exhaust gas, the exhaust line comprising a catalysis means for selective nitrogen oxides (NOx) catalytic reduction, a particle elimination means and means for feeding the product into the exhaust line, the method comprising:
   determining the exhaust gas temperature, and
   feeding the product into the exhaust line when the exhaust gas temperature reaches a threshold allowing treatment of the nitrogen oxides by the catalysis means,
   wherein the product comprises a mixture of an additive for treating particles and a reductant for eliminating nitrogen oxides (NOx), wherein the reductant comprises ammonia, or a compound generating ammonia by decomposition, or a hydrocarbon from a hydrocarbon-containing substance, oxygenated or not, and the additive comprises an additive for catalysing particle oxidation.

2. The method as claimed in claim 1, wherein the product comprises at least one metallic compound.

3. The exhaust gas depollution method as claimed in claim 2, wherein the metallic compound is an organometallic compound.

4. The exhaust gas depollution method as claimed in claim 2, wherein the metallic compound is a metal selected from among the following elements: sodium, potassium, magnesium, calcium, barium, strontium, titanium, cerium, chromium, molybdenum, manganese, iron, rubidium, cobalt, rhodium, nickel, palladium, platinum, copper, silver, or a mixture of at least two of these elements.

5. The exhaust gas depollution method as claimed in claim 3, wherein the organometallic compound comprises ferrocene.

6. The exhaust gas depollution method as claimed in claim 2, wherein the metallic compound is an inorganic metallic compound.

7. The exhaust gas depollution method as claimed in claim 6, wherein the inorganic metallic compound is a compound selected from among: fluorides, chlorides, bromides, iodides, oxides, nitrates, sulfates, phosphates, hydrides, carbonates, nitrides, or a mixture of at least two of these compounds.

8. The exhaust gas depollution method as claimed in claim 1, further comprising feeding the product into the exhaust line on a regular basis.

9. The exhaust gas depollution method as claimed in claim 1, wherein feeding the product into the exhaust gas line comprises injecting the product into the exhaust gas line, and the method further comprises controlling the injected product flow rate as a function of the amount of NOx.

10. The exhaust gas depollution method as claimed in claim 1, further comprising combining, in a single element, the catalysis means for selective nitrogen oxides catalytic reduction and the particle elimination means in an SCR catalysed filter.

11. The exhaust gas depollution method as claimed in claim 1, further comprising positioning the catalysis means for selective nitrogen oxides catalytic reduction before the particle elimination means.

12. The exhaust gas depollution method as claimed in claim 1, further comprising positioning the particle elimination means before the catalysis means for selective nitrogen oxides catalytic reduction.

13. The exhaust gas depollution method as claimed in claim 1, further comprising arranging at least one additional catalyst in the exhaust line.

14. The exhaust gas depollution method as claimed in claim 1, wherein the exhaust line is of an internal combustion engine.

15. The exhaust gas depollution method as claimed in claim 1, wherein a selective catalytic reduction filter comprises the catalysis means for selective nitrogen oxides catalytic reduction and the particle elimination means.

16. The exhaust gas depollution method as claimed in claim 1, wherein the catalysis means for selective nitrogen oxides catalytic reduction and the particle elimination means are arranged in series.

* * * * *